March 14, 1939.  A. J. WARTA  2,150,304
BINDWEED CUTTER
Filed July 17, 1937  2 Sheets-Sheet 1

Inventor
A. J. Warta
By Clarence A. O'Brien
Hyman Berman
Attorneys

March 14, 1939.  A. J. WARTA  2,150,304
BINDWEED CUTTER
Filed July 17, 1937  2 Sheets-Sheet 2

Inventor
A. J. Warta
By Clarence A. O'Brien
Hyman Berman
Attorneys

Patented Mar. 14, 1939

2,150,304

UNITED STATES PATENT OFFICE 2,150,304

BINDWEED CUTTER

Arthur J. Warta, Ellsworth, Kans.

Application July 17, 1937, Serial No. 154,310

2 Claims. (Cl. 97—144.1)

This invention relates to agricultural implements and more particularly to a bindweed cutter.

An object of the present invention is to provide a cutter of this character that is adaptable to all conditions of weather, soil and topography and will be efficient for cutting the bindweeds at the roots thereof.

A further object of the invention is to provide an economical and time saving device of this character.

The invention together with its objects and advantages will be best understood from a study of the following description taken in connection with the accompanying drawings wherein:

Figure 3 is a fragmentary detail perspective view illustrating certain features hereinafter more fully referred to.

Figure 1:
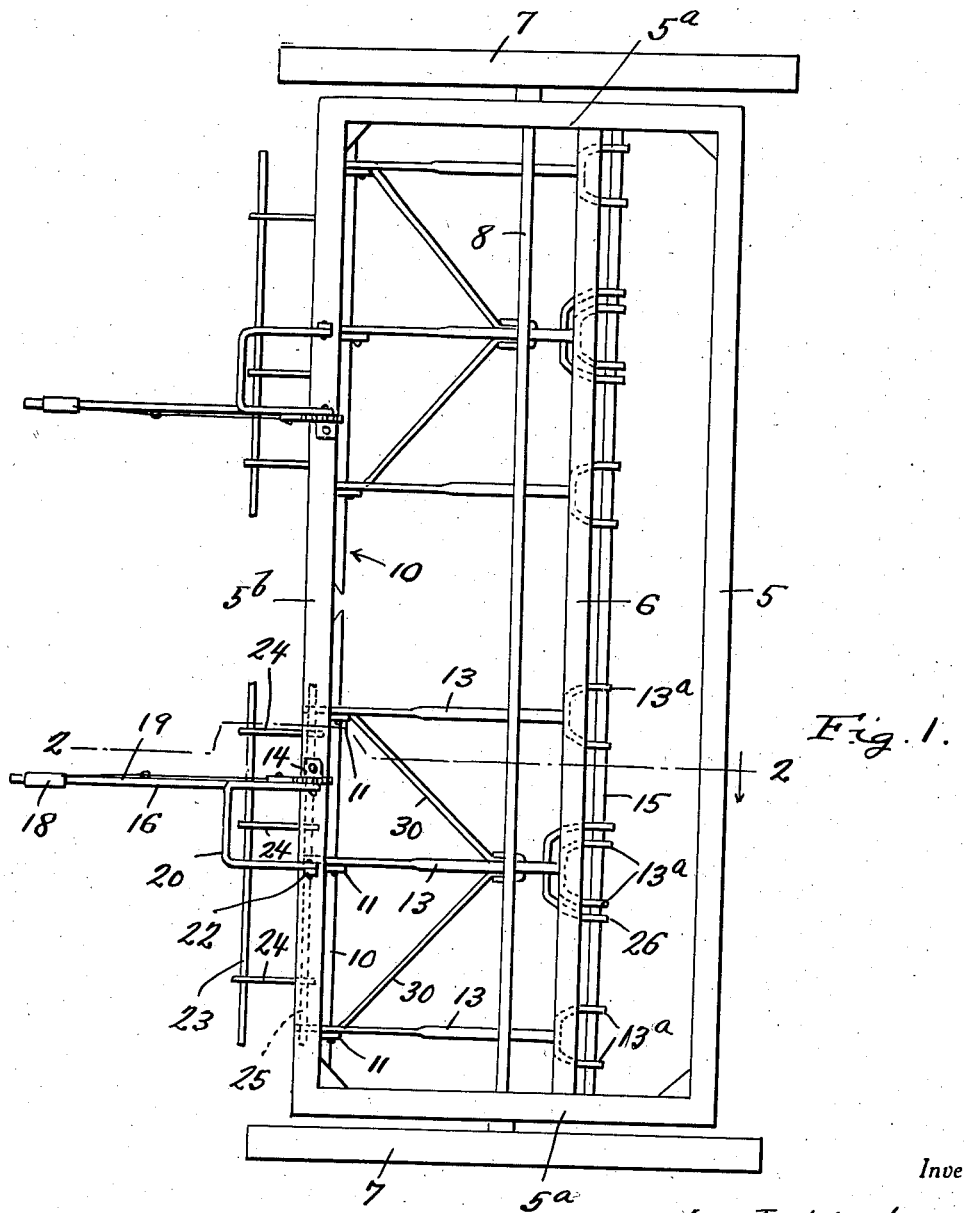
Figure 1 is a top plan view of the cutter.

Referring to the drawings by reference numerals it will be seen that in the preferred embodiment thereof the bindweed cutter comprises an elongated frame 5 formed of angle iron or other suitable material and having the ends thereof connected by longitudinal bar 6 disposed rearwardly of the longitudinal median of the frame.

Frame 5 is supported by tread wheels 7 mounted on the ends of an axle 8 journaled in suitable bearings 9 provided therefor at opposite ends of the frame 5.

A draft tongue (not shown) or other suitable draft device may be connected with the forward side of the frame 5 whereby the weed cutter may be attached to a tractor, draft animal or the like.

In the present instance I have illustrated the bindweed cutter as being equipped with two cutter blades 10 although it will be understood that any desired number of blades 10 arranged in longitudinal alignment one with the other may be employed and dependent upon the width of the frame 5.

Each blade 10 has extending upwardly therefrom a plurality, in the present instance, three laterally spaced posts or standards 11 and pivoted to the upper end of each post 11 as at 12 is one end of a beam 13.

Each beam 13 is provided with an integral fork 14 the legs of which are apertured to accommodate a fixed pivot rod 15 extending between and supported by the side members 5a of frame 5.

For raising and lowering the blade 10 and for securing the blade at the desired elevation there is mounted on the forward side 5b of frame 5 a rack segment 14 provided on a suitable bracket 15. Pivoted to the bracket 15 is a hand lever 16 provided with a dog 17 cooperable with the rack segment 14 for holding the lever 16 at the desired position of adjustment. For the dog 15 there is pivoted on the handle 16 the release handle 18 connected with the dog 15 through the medium of a wire rod 19.

Figure 2:
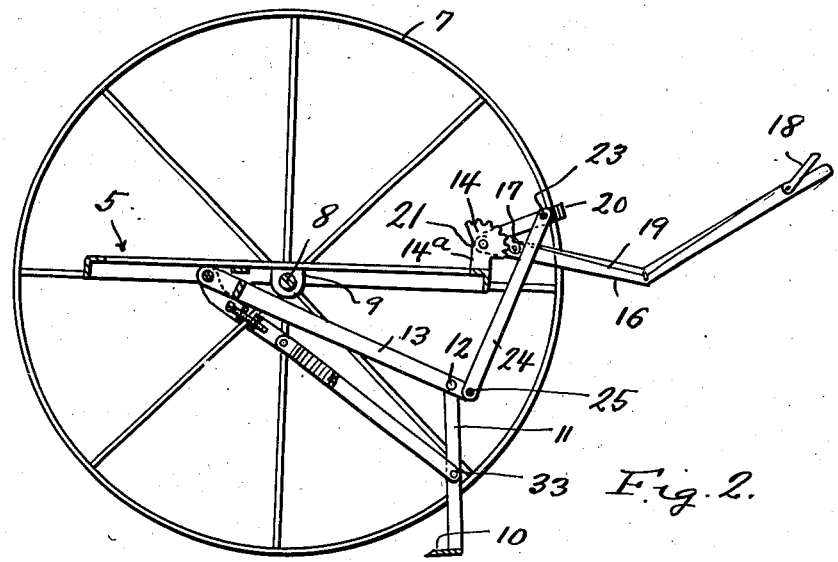
Figure 2 is a sectional view taken substantially on the line 2—2 of Fig. 3.
Figure 3:
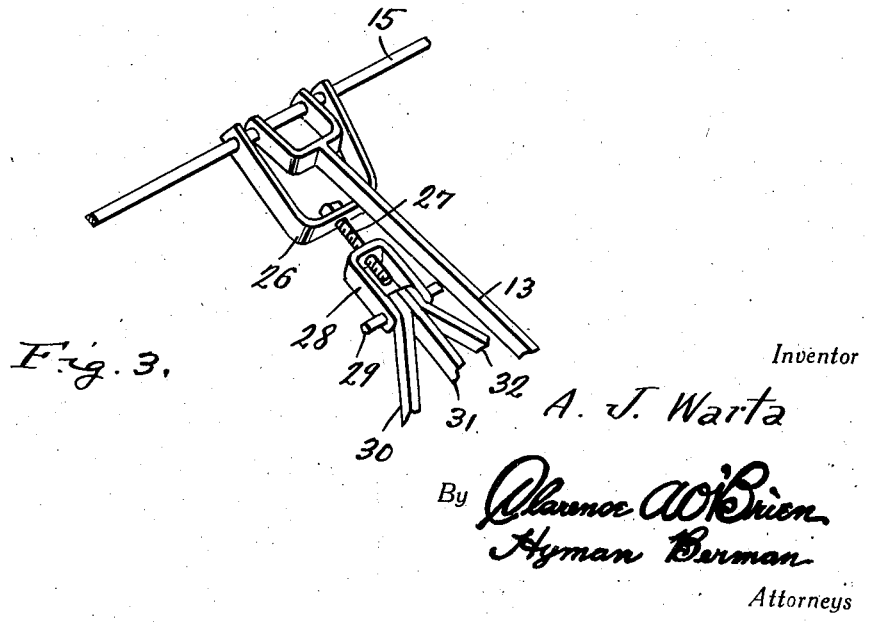

A substantially U-shaped crank member 18 has one leg thereof suitably fixed to the pivot 21 provided for the hand lever 15 and at an angle to the hand lever 16 as shown in Fig. 2. The other leg of the U-shaped crank 20 is pivoted to a bracket 22 on the forward frame member 5b as clearly shown in Fig. 1.

Extending through the leg of the U-shaped crank member 20 is a rod 23 which is operatively connected to the beams 13 through the medium of links 24 and a rod 25 that extends through apertures provided in the ends of the beams 13 pivoted to the posts 11 of blade 10 as will be clear from a study of Figs. 1 and 2.

It will thus be seen that by raising and lowering handle 16 beams 13 will be caused to swing about the pivot 15 as an axis to elevate or lower the blade 10 to control the digging depth of the blade.

For varying the angle of inclination of the blade 10 and for securing the blade 10 at the desired angle of inclination there is provided a yoke member 26 that straddles the fork of the intermediate beam 13 and the legs of the yoke member 26 as the free ends of said legs are apertured to receive the pivot rod 16.

Extending through the bight or closed in the yoke 26 is a screw 27 on which is threaded the closed end of a smaller yoke 28.

Pivoted between the legs of the smaller yoke 28 through the medium of a pivot pin 29 are one end of rods 30, 31 and 32. Rods 30, 31 and 32 are pivoted to the posts 11 intermediate the ends of the post as at 33. Thus by adjusting the yoke 28 through the medium of the screw 27 relative to the yoke 26 posts 11 are swung through a vertical arc swinging about their pivot 12 to position the blade 10 at the desired angle to the perpendicular.

Thus it will be seen that in accordance with the present invention provision is made not only for adjusting the blade 10 to control the digging depth thereof, but provision is also made for adjusting the angular position of the blade 10 whereby the blade will enter the ground at any desired angle.

In actual practice it will be apparent that when the device, hitched behind a tractor or other draft vehicle or animal is drawn over the ground blade 10 will enter the ground to cut the bindweeds at the roots of the latter.

It will also be found in actual practice that blade 10 will remain sharp over an extended period of time.

Further pin 29 may be and preferably is made of wood so that in the event the blade 10 strikes a large rock or other hard and immovable object pin 29 will shear thus freeing the blade 10 to swing vertically upwardly and to clear or ride over such objects without material damage being done to the blade.

It is thought that a clear understanding of the construction and utility and advantages of an invention of this character will be had without a more detailed description.

What is claimed is:

1. In an agricultural implement of the character described, a wheel supported frame, a fixed pivot rod mounted on said frame, a blade carrying beam having one end pivotally engaged with said rod, a blade pivotally connected to the free end of said beam, a yoke member pivotally engaged with said pivot rod, a second yoke member, an adjusting screw connecting said yoke members together whereby the second yoke may be adjusted to the first yoke, and a bar pivotally connecting the second yoke with said blade whereby the angle of the blade to the perpendicular may be adjusted by an adjustment of the second yoke relative to the first mentioned yoke, and means connected with said blade for moving the blade toward and away from the ground and for securing the blade at the desired position of adjustment for controlling the digging depth thereof.

2. In a bindweed cutter of the character described, a wheel supported frame, a rod mounted on said frame and extending from one side to the other of the same, a plurality of beams pivotally connected at one end with said rod, a blade having standards rising therefrom and pivoted at their upper ends to said beams, a lever pivotally mounted on said frame, link means connecting said lever with said beams for vertically swinging the beams incidental to a swinging movement of said lever, a rack segment mounted on said frame, and said lever being provided with a detent structure cooperable with the rack segment for securing said blade at the desired position of elevation, a yoke member pivotally engaged with said rod, an adjusting screw extending through the closed end of said yoke member, a second yoke member having a closed end threadedly engaged with said adjusting screw, a plurality of rods pivoted at one end to the blade standards, and a frangible pin pivotally connecting said rods to the second mentioned yoke member, as and for the purpose specified.

ARTHUR J. WARTA.